United States Patent [19]

Watanabe

[11] Patent Number: 5,135,980
[45] Date of Patent: Aug. 4, 1992

[54] ELECTROCONDUCTIVE SILICONE RUBBER COMPOSITION

[75] Inventor: Satoshi Watanabe, Ohta, Japan

[73] Assignee: Toshiba Silicone Co., Ltd., Japan

[21] Appl. No.: 689,211

[22] Filed: Apr. 22, 1991

[30] Foreign Application Priority Data

Apr. 27, 1990 [JP] Japan .................. 2-113424

[51] Int. Cl.$^5$ .................. C08K 3/04; H01B 1/04
[52] U.S. Cl. .................. 524/496; 524/495; 524/847; 252/511
[58] Field of Search .................. 524/496, 495, 847; 252/511

[56] References Cited

U.S. PATENT DOCUMENTS

| | | | |
|---|---|---|---|
| 4,505,848 | 3/1985 | Kobayashi | 524/495 |
| 4,728,687 | 3/1988 | Watanabe et al. | 524/496 |
| 4,833,305 | 5/1989 | Mashimo et al. | 219/548 |
| 4,898,689 | 2/1990 | Hamada et al. | 524/496 |
| 4,971,726 | 11/1990 | Maeno et al. | 524/496 |

*Primary Examiner*—Paul R. Michl
*Assistant Examiner*—Peter Szekely

[57] ABSTRACT

Disclosed is an electroconductive silicone rubber composition containing, as a carbon black, a furnace black having an iodine adsorption amount of 50 mg/g or less and a DBP oil absorption amount of 200 ml/100 g or more. The composition has an improved and suitable crosslinking rate. The composition provides a cured product having a good crosslinking density and a sufficient electroconductive capacity.

11 Claims, No Drawings

ELECTROCONDUCTIVE SILICONE RUBBER COMPOSITION

The present application claims the priority of Japanese Patent Application Serial No. 2-113424 filed on Apr. 27, 1990.

FIELD OF THE INVENTION

The present invention relates to an electroconductive silicone rubber composition and, more particularly, to a carbon black-containing electroconductive silicone rubber composition having an improved crosslinking rate. The composition may be crosslinked to form a crosslinked product having an elevated crosslinking density.

BACKGROUND OF THE INVENTION

Silicone compositions which are cured to form silicone rubbers are well known. Because of the excellent properties of the cured product, such as excellent weather- resistance, heat-resistance, cold-resistance and electric insulating property thereof, the composition has widely been used as various shaping materials, such as potting material, coating material or framing material, for electric and electronic parts. As the case may be, a silicone composition which is naturally an insulating material may be made electroconductive to give an electroconductive silicone composition.

Methods of making a silicone composition electroconductive by incorporating an electroconductive carbon black into the composition are generally known. For instance, JP-A-54-139659 (the term "JP-A" as used herein means an "unexamined published Japanese patent application") discloses an electroconductive organopolysiloxane elastomer containing both a furnace black and an acetylene black; JP-A-55-120656 discloses a liquid organopolysiloxane composition containing hollow shell-shaped carbon black grains having a surface area of 900 m$^2$/g or more; JP-A-55-108455 discloses an extrudable liquid organopolysiloxane composition containing both a carbon black and an electroconductive fibrous material; and JP-A-56-120761 discloses a silicone rubber composition containing a carbon black having a specific surface area of 80 m$^2$/g or more .

Carbon black, which is incorporated into a silicone composition for the purpose of making the composition electroconductive, may be classified into various kinds of thermal black, furnace black, acetylene black, etc., in accordance with the means of manufacturing the same. Every type of carbon black contains a slight amount of sulfur.

It is well known that the sulfur in carbon black will be a factor in inhibiting the crosslinking reaction of a curing silicone composition. Accordingly, in the case of a silicone rubber composition containing a carbon black as a filler, a large amount of a crosslinking agent is necessary for elevating the curing speed of the composition. Further, since a carbon black has a high surface activity, it adsorbs the components of a crosslinking agent. In the situation where the amount of the carbon black in the silicone composition is increased, it would be difficult to obtain the necessary crosslinking density merely by increasing the amount of the crosslinking agent. Additionally, there is still another problem in that an increase in the amount of the crosslinking agent in the silicone composition lowers the rubber characteristics of the hardened silicone rubber derived from the composition.

SUMMARY OF THE INVENTION

The present invention has been effected in order to overcome the above-mentioned problems in this technical field, and the object of the present invention is to provide a carbon black-containing electroconductive silicone rubber composition having an improved and suitable crosslinking rate. Despite the presence of carbon black therein, the silicone rubber composition of the present invention can be crosslinked to give a crosslinked product having an improved crosslinking density.

This is achieved by incorporating a carbon black having an iodine adsorption amount of 50 mg/g or less and a DBP (dibutyl phthalate) oil absorption amount of 200 ml/100 g or more into the silicone rubber composition.

Specifically, the present invention provides a carbon black-containing electroconductive silicone rubber composition, which is characterized in that the carbon black is a furnace black having an iodine adsorption amount of 50 mg/g or less and a DBP oil absorption amount of 200 mg/100 g or more.

DETAILED DESCRIPTION OF THE INVENTION

The electroconductive silicone rubber composition of the present invention is prepared by incorporating a carbon black characterized by the properties described above and, optionally, various additives, into a polyorganosiloxane composition to be cured at room temperature or under heat to give a rubber elastic product, followed by uniformly dispersing the carbon black and optional ingredients in the composition.

The carbon black to be incorporated into the composition of the present invention is a filler which is characterized by its function of making the resulting composition electroconductive. Specifically, the carbon black is a furnace black having an iodine adsorption amount of 50 mg/g or less and a DBP oil absorption amount of 200 mg/100 g or more, and a relatively large grain size but a weak reinforcing capacity and a weak surface activity.

The carbon black's iodine adsorption amount indicates the specific surface area and strength of the structure (chain structure of carbon primary grains). The furnace black to be used in the present invention has an iodine adsorption amount of 50 mg/g or less, which is far smaller than that of a general carbon black of from 140 mg/g to 300 mg/g. That is, the iodine adsorption amount range of the furnace black usable in the present invention is one which has heretofore been considered unusable for the purpose of imparting electroconductivity to silicone rubber compositions. The reason for this is that when a furnace black having such an iodine adsorption amount is incorporated into a silicone composition, it would be effective for preventing the hindrance to crosslinkability of the composition but it could not impart a sufficient electroconductivity to the resulting composition. In the present invention, therefore, the furnace black to be used is further characterized by its a DBP oil absorption amount which is an index of the growth degree of the structure of the carbon black itself. Specifically, the furnace black for use in the invention has a DBP oil absorption amount of 200 ml/100 g or more. The DBP oil absorption amount of the furnace black used in this invention is far higher than that of a general furnace black of from 30 mg/100 g to 140 ml/100 g. By incorporating a furnace black into having a DBP oil absorption amount of 200 ml/100g or higher to a silicone rubber composition, the resulting composition will be well reinforced but can hardly be kneaded, and the kneaded compound would be hard. Therefore, the furnace black of the type used in the present invention has heretofore been rejected in general use because of poor operatability.

It has been found that the growth degree of the structure of a carbon black may increase, but the strength of the structure may decrease by satisfying both the defined DBP oil absorption amount of being 200 ml/100 g or more and the defined iodine adsorption amount of being 50 mg/g or less. As a result, when a strong shearing force such as admixture or kneading is applied to the carbon black of this type, the structure of the carbon black can easily be broken. The phenomenon is considered to be one which applies only to a silicone composition composed of a polysiloxane base polymer having an extremely low shearing force to carbon black.

Specifically, the carbon black (furnace black) falling within the scope of the present invention has a weak surface activity and therefore is hardly a factor in inhibiting the crosslinkability of the silicone composition. Additionally, since it has a highly-grown structure, it has an electroconductive function. Moreover, since the strength of the structure of the carbon black is small, high filling of the carbon black into a silicone rubber is possible.

The silicone rubber composition of the present invention contains a polyorganosiloxane composition as the main component, which is prepared by uniformly admixing and dispersing (a) a polyorganosiloxane base polymer, (b) the furnace black described above, and (c) a curing agent, and optionally various additives.

The silicone base polymer (a) and the curing agent (c) are suitably selected in accordance with the reaction mechanism for obtaining a rubber-like elastic material. The reaction mechanism is known to include, for example, (1) crosslinking reaction with an organic peroxide as the curing agent, (2) condensation reaction and (3) addition reaction. It is well known that the preferred combination of the component (a) and the component (c) as a curing catalyst and/or crosslinking agent is determined in accordance with the reaction mechanism.

Specifically, where the crosslinking reaction (1) is selected as the reaction mechanism, in general, a polydiorganosiloxane having at least two alkenyl groups bonded to the silicone atoms in one molecule is used as the base polymer of the component (a). In that case, the curing agent is an organic peroxide, such as benzoyl peroxide, 2,4-dichlorobenzoyl peroxide, dicumyl peroxide, cumyl-t-butyl peroxide, 2,5-dimethyl-2,5-di-t-butyl-peroxyhexane and di-t-butyl peroxide. In particular, dicumyl peroxide, cumyl-t-butyl peroxide, 2,5-dimethyl-2,5-di-t-butylperoxyhexane and di-t-butyl peroxide are preferred curing agents, as giving a low compression permanent strain. Such curing agents are used singly or as a mixture of two or more.

The amount of the organic peroxide curing agent of component (c) used in the polyorganosiloxane composition is preferably from 0.05 to 15 parts by weight to 100 parts by weight of the silicone base polymer of component (a). If the amount of the organic peroxide curing agent in the composition is less than 0.05 part by weight, curing will not be effected sufficiently. On the other hand, if the amount is more than 15 parts by weight, the excess organic peroxide will have no furthere favorable effect and will adversely affect the physical properties of the final silicone rubber product.

If a condensation reaction (2) is selected as the reaction mechanism, a polydiorganosiloxane having silicon-bonded hydroxyl groups at both terminal positions is used as the base polymer of component (a). In that case, the curing agent of component (c) may be a crosslinking agent selected from, for example, alkoxy-containing silicon compounds such as ethyl silicate, propyl silicate, methyltrimethoxysilane, vinyltrimethoxysilane, methyltriethoxysilane, vinyltriethoxysilane, methyltris(methoxyethoxy)silane, vinyltris(methoxyethoxy)silane and methyltripropenoxysilane; acetoxy-containing silicon compound such as methyltriacetoxysilane and vinyltriacetoxysilane; and methyltri(acetoneoxime)silane, vinyltri(acetoneoxime) silane, methyltri(methylethylketoxime)silane and vinyltri(methylethylketoxime)silane; as well as partial hydrolyzates of the above-mentioned compounds. Additionally, suitable curing agents also include cyclic siloxanes such as hexamethyl-bis(diethylaminoxy) cyclotetrasiloxane, tetramethyldibutyl-bis(diethylaminoxy)cyclotetrasiloxane, heptamethyl(-diethylaminoxy)cyclotetrasiloxane, pentamethyl-tris(-diethylaminoxy)cyclotetrasiloxane, hexamethyl-bis(methylethylaminoxy)cyclotetrasiloxane and tetramethyl-bis(diethylaminoxy)-mono(methylethylaminoxy)cyclotetrasiloxane. Accordingly, the crosslinking agent may have a silane or siloxane structure, wherein the siloxane structure may be either branched or cyclic. The crosslinking agent may be used singly or in combinations of two or more.

As a curing catalyst for the curing agent of the component (c), useful are metal carboxylates such as iron octoate, cobalt octoate, manganese octoate, tin naphthenate, tin caprylate and tin oleate; as well as organic tin compounds such as dimethyl tin dioleate, dimethyl tin dilaurate, dibutyl tin diacetate, dibutyl tin dioctoate, dibutyl tin dilaurate dibutyl tin dioleate, diphenyl tin diacetate, dibutyl tin oxide, dibutyl tin dimethoxide, dibutyl-bis(triethoxysiloxy) tin and dioctyl tin dilaurate.

The amount of the above-mentioned curing agent of component (c) to be in the composition of the present invention is preferably from 0.1 to 20 parts by weight per 100 parts by weight of the base polymer of component (a). If the amount of the crosslinking agent is less than 0.1 part by weight, the cured rubber product will have sufficient strength. On the other hand, if the amount is more than 20 parts by weight, the cured rubber product will be brittle. The amount of the curing catalyst to be used in the composition is a catalytic amount, which is preferably from about 0.01 to about 5 parts by weight per 100 parts by weight of the base polymer of component (a). If the amount is less than this defined range, the curing catalyst will be ineffective and, as a result, a long time would be necessary for completing cure, and cure of the inner part, which is remote from contact with air, would be insufficient. On the other hand, if the amount is in excess of the above range the storage stability would be lower. Accordingly, a more preferred range of the amount is from about 0.1 to about 3 parts by weight.

If an addition reaction (3) is selected as the reaction mechanism, the same base polymer as that used in a crosslinking reaction (1) can be used also in the addition reaction. A platinum-containing catalyst such as chloroplatinic acid, platinum-olefin complex, platinum-vinylsiloxane complex, platinum black and platinum-triphenylphosphine complex is used as a curing catalyst of component (c); and as a crosslinking agent of component (c), a polyorganohydrogen siloxane in which the number of hydrogen atoms bonded to the silicon atom is at least more than two in average in one molecule, is used. And the organic part here is the same as in component (a).

The amount of the curing catalyst in the curing agent of component (c) is a catalytic amount which is preferably from 1 to 1000 ppm as platinum metal based on the base polymer of component (a). If the amount of the curing catalyst is less than 1 ppm as platinum metal, cure will not proceed sufficiently. On the other hand, if the amount is more than 1000 ppm, any further improvement of the cure speed is not anticipated. The amount of the crosslinking agent (c) is preferably such that the number of hydrogen atom(s) bonded to the silicon atom in the crosslinking agent is from 0.5 to 4.0 for every alkenyl group in component (a). More preferably, the number of the hydrogen atom(s) is from 1.0 to 3.0 for every alkenyl group. If it is less than 0.5, cure of the composition will not be effected sufficiently and, as a result, the hardness of the cured product will be low. On the other hand, if it is more than 4.0, the cured product will have lowered and poor physical properties and heat-resistance.

The organic group in the polyorganosiloxane of the base polymer of component (a) to be used in the above-mentioned various reaction mechanisms is a monovalent substituted or unsubstituted hydrocarbon group. As examples of the group, there are mentioned unsubstituted hydrocarbon groups, for example, an alkyl group such as methyl group, ethyl group, propyl group, butyl group, hexyl group or dodecyl group; an aryl group such as phenyl group; an aralkyl group such as 8-phenylethyl group or 8-phenylpropyl group; and substituted hydrocarbon groups, such as chloromethyl groups and 3,3,3-trifluoropropyl groups. In general, methyl groups are used in most cases, as production of base polymers containing them is easy.

In preparing the electroconductive silicone rubber composition of the present invention, from the viewpoint of the electroconductive characteristics of the final product to be obtained from the composition, the addition reaction (3) or the crosslinking reaction by vulcanization with an organic peroxide (1) is preferred. The polymerization degree of the polysiloxane base polymer to be used is preferably 1000 or more. That is, a so-called millable type polymer is preferred for use in the present invention. This may be presumed because a polymer of this type would give a mixture having a pertinent shearing force in admixture so that electroconductive properties can be obtained more readily by incorporation of the polymer into the composition.

In the composition of the present invention, the amount of the furnace black will depend upon the polymerization degree of the polysiloxane base polymer in the composition and upon the characteristics of the silicone rubber composition to be obtained. Therefore, the amount is not specifically defined. In general, however, the amount may be from 10 to 500 parts by weight, preferably from 10 to 200 parts by weight, per 100 parts by weight of the polysiloxane base polymer.

The silicone rubber composition of the present invention may further optionally contain additives such as filler, pigment, heat-resistance improving agent and a fire-proofing agent. Additionally, it may also contain any other polyorganosiloxanes as long as the additional ones do not interfere with the effects of the present invention. Examples of such additives or additional polyorganosiloxanes include in general, reinforcing fillers such as fumed silica, precipitated silica and diatomaceous earth, as well as titanium oxide, aluminium oxide, zinc oxide, iron oxide, cerium oxide, mica, clay, graphite, zinc carbonate, manganese carbonate, cerium hydroxide, glass beads, polydimethylsiloxanes, and alkenyl group-containing polysiloxanes.

As mentioned above in detail, the electroconductive silicone rubber composition of the present invention is free from the problem of reduced the crosslinking rate, which has heretofore been inevitable in the conventional carbon black-containing silicone rubber compositions, and the composition of this invention has improved and pertinent crosslinking rate and electroconductive capacity.

The present invention is explained in more detail by way of the following examples, which, however, are not intended to restrict the scope of the present invention. In the following examples, all parts are by weight, unless otherwise specifically indicated.

EXAMPLE 1

100 parts of polydimethylsiloxane containing 0.15 mol % of methylvinylsiloxane unit and having trimethylsilyl-blocked terminal units (polymerization degree: about 6,000) and 40 parts of furnace black (A) having an iodine adsorption amount of 48 mg/g and a DBP oil absorption amount of 210 ml/100 g, as a carbon black, were put in a kneader, as indicated in Table 1 below, and kneaded therein. After solidified, the resulting composition was taken out from the kneader.

Next, one part of 2,5-dimethyl-2,5-di-t-butylperoxyhexane, as a crosslinking agent, was added to the composition and admixed to prepare a silicone rubber composition.

For comparison, a comparative carbon black (furnace black (B)) having an iodine adsorption amount of 800 mg/g and a DBP oil absorption amount of 180 ml/100 g and a comparative carbon (furnace black (C)) having an iodine adsorption amount of 30 mg/g and a DBP oil absorption amount of 140 ml/100 g were employed in place of furnace black (A), and comparative silicone rubber compositions (Comparative Example 1 and Comparative Example 2) were prepared as indicated also in Table 1 below.

Each of the thus prepared silicone rubber compositions was evaluated with respect to cure speed and the characteristics of the cured final rubber products, in accordance with the methods mentioned below.

For measuring the cure speed, a rheometer (manufactured by Monsanto Co.) was used. The speed was represented by the time for obtaining 10% torque (T10) of the maximum torque value and 90% torque (T90) of the same at 170° C. The larger the T value, the greater the hindrance to cure speed.

Next, each composition was formed into a 2 mm-thick sheet and press-cured at 170° C. for 10 minutes and thereafter subjected to secondary cure (post-cure) at 200° C. for 4 hours. The thus cured sheet was then returned to room temperature to obtain a silicone rubber sheet. The silicone rubber sheet was subjected to a tensile test by JIS K 6301 (physical testing methods for vulcanized rubber) to measure the tensile strength and elongation modulus. Next, a 1 mm-thick sheet was also prepared in the same manner as described above from each composition, and the volume resistivity of the sheet was measured.

The results obtained are shown in Table 1 below.

EXAMPLE 2

100 parts of polydimethylsiloxane base oil having a viscosity of 3000 cps at 25° C. and having dimethylvinylsilyl-blocked groups at both terminal ends was blended with 30 parts of the same furnace black (A) as that used in Example 1, 0.5 part of isopropyl solution of 2 % by weight, as platinum, of chloroplatinic acid (catalyst) and 1.0 part of methylhydrogen-polysiloxane (crosslinking agent) having a viscosity of 20 cSt (centistokes) at 25° C. and having trimethylsilyl-blocked groups at both terminal ends, and the mixture of those ingredients was uniformly dispersed to prepare a silicone rubber composition.

For comparison, comparative silicone rubber compositions were prepared in the same manner as described above, except that the carbon black of furnace black (A) was replaced by furnace black (B) and furnace black (C) (Comparative Example 3 and Comparative Example 4).

Each of the thus prepared silicone rubber compositions was evaluated in the same manner as in Example 1, with respect to the cure speed and the characteristics of the final rubber products obtained from the compositions.

The results obtained are shown in Table 2 below.

While the invention has been described in detail and with reference to specific embodiments thereof, it will be apparent to one skilled in the art that various changes and modifications can be made therein without departing from the spirit and scope thereof.

TABLE 1

| | Example | Comparative Example | | | |
|---|---|---|---|---|---|
| | 1 | 1 | 2 | Remarks | |
| Vinyl-containing Polysiloxane Composition (parts) | 100 | 100 | 100 | I-Adsorption | DBP-Adsorption |
| Carbon Black | | | | | |
| A | 40 | — | — | 48 mg/g | 210 ml/100 g |
| B | — | 40 | — | 800 mg/g | 180 ml/100 g |
| C | — | — | 40 | 30 mg/g | 140 ml/100 g |
| Crosslinking Agent | 1 | 1 | 1 | | |
| T10 | 20 sec | 2 min 10 sec | 1 min 40 sec | | |
| T90 | 1 min 30 sec | 7 min 40 sec | 4 min 50 sec | | |
| Tensile Strength | 56 | 27 | 28 | | |
| Elongation Percentage | 580 | 120 | 340 | | |
| Volume Resistivity | $3 \times 10^1$ | $2 \times 10^2$ | $9 \times 10^9$ | | |

TABLE 2

| | Example | Comparative Example | |
|---|---|---|---|
| | 2 | 3 | 4 |
| Composition (parts) | | | |
| Vinyl-containing Polysiloxane | 100 | 100 | 100 |
| Carbon Black | | | |
| A | 30 | — | — |
| B | — | 30 | — |
| C | — | — | 30 |
| Crosslinking Agent | 1 | 1 | 1 |
| Catalyst | 0.5 | 0.5 | 0.5 |
| T10 | 30 sec | Not vulcanized | 2 min 40 sec |
| T90 | 1 min 40 sec | Not vulcanized | 7 min 10 sec |
| Tensile Strength | 42 | | 32 |
| Elongation Percentage | 460 | | 720 |
| Volume Resistivity | $1.2 \times 10^1$ | | $3.0 \times 10^{13}$ |

What is claimed is:

1. An electroconductive silicone rubber composition comprises carbon black wherein the carbon black is a furnace black having an iodine adsorption amount of 50 mg/g or less and a DBP oil absorption amount of 200 ml/100 g or more.

2. The composition of claim 1 wherein the silicone rubber composition is cured under heat with an organic peroxide curing agent.

3. The composition of claim 1 wherein the silicone rubber composition is cured by an addition reaction.

4. The composition of claim 2 wherein the silicone rubber composition comprises a polysiloxane base polymer having a polymerization degree of 1000 or more.

5. The composition of claim 3 wherein the silicone rubber composition comprises a polysiloxane base polymer having a polymerization degree of 1000 or more.

6. The composition of claim 4 wherein the carbon black is present in an amount ranging from 10 to 200 parts by weight based on 100 parts by weight of the polysiloxane base polymer.

7. The composition of claim 5 wherein the amount of carbon black is from 10 to 200 parts by weight based on 100 parts, by weight of the polysiloxane base polymer.

8. An electroconductive silicone, rubber composition consisting essentially of by weight:
 (a) 100 parts of a polydiorganosiloxane having at least two silicon-bonded alkenyl groups and a polymerization degree of 1000 or more, wherein the organo portion of the polydiorganosiloxane is a monovalent substituted or unsubstituted hydrocarbon group;
 (b) from about 10 to about 500 parts of a furnace black having an iodine adsorption amount of 50 mg/g or less and a DBP oil absorption amount of 200 ml/100g or more; and
 (c) from about 0.05 to about 15 parts of an organic peroxide or combination of organic peroxides.

9. An addition-curable electroconductive silicone rubber composition consisting essentially of by weight:
 (a) 100 parts of a polydiorganosiloxane having at least two silicon-bonded alkenyl groups and a polymerization degree of 1000 or more, wherein the organo portion of the polydiorganosiloxane is a monovalent substituted or unsubstituted hydrocarbon group;
 (b) from about 10 to about 500 parts of a furnace black having an iodine adsorption amount of 50 mg/g or less and a DBP oil absorption amount of 200 ml/100 g or more;
 (c) a hydrogen-containing polydiorganosiloxane as crosslinking agent, containing more than two silicon-bonded hydrogen groups per molecule and present in an amount sufficient to provide from 0.5 to 4.0 silicon-bonded hydrogen groups for every alkenyl group in (a); and
(d) a catalytic amount of platinum-containing curing catalyst, 10. A condensation-curable electroconductive silicone rubber composition consisting essentially of by weight:
(a) 100 parts of a polydiorganosiloxane terminated at both ends with silicon-bonded hydroxyl groups and a polymerization degree of 1000 or more, wherein the organo portion of the polydiorganosiloxane is a monovalent substituted or unsubstituted hydrocarbon group;
(b) from about 10 to about 500 parts of a furnace black having an iodine adsorption amount of 50 mg/g or less and a DBP oil absorption amount of 200 ml/100 g or more;
(c) from about 0.1 to 20 parts of a curing agent selected from alkoxy-containing silicon compounds and partial hydrolyzates thereof, acetoxy-containing silicon compounds and partial hydrolyzates thereof; and cyclic siloxanes; and
(d) a catalytic amount of a curing catalyst selected from metal carboxylutes and organic tin compounds.

11. The composition of claim 8 wherein the organic peroxide is selected from the group consisting of dicumyl peroxide, cumyl-t-butyl peroxide, 2,5-dimethyl-2,5-di-t-butyl peroxyhexane and di-ti-butyl peroxide.

* * * * *